US011454813B2

(12) United States Patent
Chang et al.

(10) Patent No.: US 11,454,813 B2
(45) Date of Patent: Sep. 27, 2022

(54) HOLOGRAPHIC DISPLAY SYSTEMS WITH POLARIZATION CORRECTION AND DISTORTION REDUCTION PROVIDING ENHANCED IMAGE QUALITY

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 428 days.

(21) Appl. No.: 16/676,769

(22) Filed: Nov. 7, 2019

(65) Prior Publication Data
US 2021/0141223 A1    May 13, 2021

(51) Int. Cl.
*G02B 27/01*    (2006.01)
*G02B 27/28*    (2006.01)

(52) U.S. Cl.
CPC ....... *G02B 27/0103* (2013.01); *G02B 27/288* (2013.01); *G02B 2027/011* (2013.01)

(58) Field of Classification Search
None
See application file for complete search history.

(56) References Cited

U.S. PATENT DOCUMENTS

| 7,924,146 B2 | 4/2011 | Seder et al. |
| 7,936,489 B2 | 5/2011 | Brandt et al. |
| 8,098,170 B1 | 1/2012 | Szczerba et al. |
| 8,098,171 B1 | 1/2012 | Szczerba et al. |
| 8,164,548 B2 | 4/2012 | Kimura |
| 8,269,652 B2 | 9/2012 | Seder et al. |
| 8,317,329 B2 | 11/2012 | Seder et al. |
| 8,344,894 B2 | 1/2013 | Szczerba et al. |
| 8,350,724 B2 | 1/2013 | Szczerba et al. |
| 8,358,224 B2 | 1/2013 | Seder et al. |
| 8,384,531 B2 | 2/2013 | Szczerba et al. |
| 8,384,532 B2 | 2/2013 | Szczerba et al. |

(Continued)

FOREIGN PATENT DOCUMENTS

CN    101467106 A    6/2009

OTHER PUBLICATIONS

Office Action dated Nov. 24, 2021 from German Patent Office for German Patent Application No. 102020126896.3; 6 pages.

(Continued)

*Primary Examiner* — Derek S. Chapel

(57) ABSTRACT

A holographic display system is provided and includes a light source, a holographic projector, and a polarizer. The light source is configured to generate a first light beam. The holographic projector includes a spatial light modulator configured to adjust phases of respective portions of the first light beam to generate a phase hologram beam. The phase hologram beam comprises a first polarization and a second polarization. The polarizer is configured to filter out light having the first polarization from the phase hologram beam to provide at least a portion of a filtered phase hologram beam at a diffuser to generate a holographic image, wherein the filtered phase hologram beam includes light with the second polarization and does not include light with the first polarization.

19 Claims, 9 Drawing Sheets

(56) References Cited

U.S. PATENT DOCUMENTS

| | | |
|---|---|---|
| 8,395,529 B2 | 3/2013 | Seder et al. |
| 8,514,099 B2 | 8/2013 | Seder et al. |
| 8,514,101 B2 | 8/2013 | Mathieu et al. |
| 8,547,298 B2 | 10/2013 | Szczerba et al. |
| 8,605,011 B2 | 12/2013 | Seder et al. |
| 8,606,430 B2 | 12/2013 | Seder et al. |
| 8,629,784 B2 | 1/2014 | Szczerba et al. |
| 8,629,903 B2 | 1/2014 | Seder et al. |
| 8,633,979 B2 | 1/2014 | Szczerba et al. |
| 8,686,872 B2 | 4/2014 | Szczerba et al. |
| 8,692,739 B2 | 4/2014 | Mathieu et al. |
| 8,704,653 B2 | 4/2014 | Seder et al. |
| 8,711,486 B2 | 4/2014 | Tsimhoni et al. |
| 8,781,170 B2 | 7/2014 | Mathieu et al. |
| 8,818,708 B2 | 8/2014 | Mathieu et al. |
| 8,912,978 B2 | 12/2014 | Szczerba et al. |
| 8,924,150 B2 | 12/2014 | Tsimhoni et al. |
| 8,941,690 B2 | 1/2015 | Seder et al. |
| 8,977,489 B2 | 3/2015 | Szczerba et al. |
| 9,008,904 B2 | 4/2015 | Szczerba et al. |
| 9,057,874 B2 | 6/2015 | Seder et al. |
| 9,162,622 B2 | 10/2015 | Szczerba et al. |
| 9,443,429 B2 | 9/2016 | Mathieu et al. |
| 10,302,937 B2 | 5/2019 | Ferris et al. |
| 10,747,314 B1 | 8/2020 | Chang et al. |
| 10,860,093 B1 | 12/2020 | Chang et al. |
| 10,880,529 B2 | 12/2020 | Chang et al. |
| 10,996,470 B2 | 5/2021 | Chang et al. |
| 10,996,480 B1 | 5/2021 | Chang et al. |
| 11,024,056 B2 | 6/2021 | Chang et al. |
| 11,106,044 B2 | 8/2021 | Seder et al. |
| 11,275,243 B2 | 3/2022 | Chang et al. |
| 2010/0165429 A1 | 7/2010 | Buckley et al. |
| 2011/0157667 A1 | 6/2011 | Lacoste et al. |
| 2016/0109701 A1 | 4/2016 | Goldman-Shenhar et al. |
| 2017/0161949 A1 | 6/2017 | Seder et al. |
| 2017/0161950 A1 | 6/2017 | Seder et al. |
| 2020/0073138 A1 | 3/2020 | Chang |
| 2020/0073139 A1 | 3/2020 | Chang |
| 2020/0310113 A1 | 10/2020 | Chang et al. |
| 2021/0041694 A1 | 2/2021 | Chang et al. |
| 2021/0041695 A1 | 2/2021 | Chang et al. |
| 2021/0191132 A1* | 6/2021 | Karner ............... G02B 27/0103 |

OTHER PUBLICATIONS

Office Action dated Jun. 1, 2022 from Chinese Patent Office for Chinese Patent Application No. 202011230158.X; 8 pages.

* cited by examiner

HOLOGRAPHIC DISPLAY SYSTEMS WITH POLARIZATION CORRECTION AND DISTORTION REDUCTION PROVIDING ENHANCED IMAGE QUALITY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to display systems and methods for vehicles and more particularly to head up display systems of vehicles.

A driver of a vehicle traditionally views surroundings of a vehicle through windows, wind shields, and other glass of the vehicle. The driver may control vehicle acceleration, deceleration, and steering based on the driver's visual observation of the surroundings of the vehicle.

A vehicle may include one or more displays that display various information. For example, some vehicles include an infotainment system that includes a display that displays various infotainment and other vehicle information. A vehicle may also include a head up display (HUD) that displays information by forming a virtual image at a certain distance with reflection of a windshield. For example, the HUD may display a vehicle speed and other vehicle information.

SUMMARY

A holographic display system is provided and includes a light source, a holographic projector, and a polarizer. The light source is configured to generate a first light beam. The holographic projector includes a spatial light modulator configured to adjust phases of respective portions of the first light beam to generate a phase hologram beam. The phase hologram beam comprises a first polarization and a second polarization. The polarizer is configured to filter out light having the first polarization from the phase hologram beam to provide at least a portion of a filtered phase hologram beam at a diffuser to generate a holographic image, wherein the filtered phase hologram beam includes light with the second polarization and does not include light with the first polarization.

In other features, the holographic display system further includes the diffuser configured to receive the at least a portion of the filtered phase hologram beam and provide the holographic image.

In other features, the holographic display system further includes a beam splitter, a wavefront sensor, and a control module. The beam splitter is configured to receive and split the filtered phase hologram beam to provide a first portion of the filtered phase hologram beam and a second portion of the filtered phase hologram beam. The second portion is provided to the diffuser. The wavefront sensor is configured to detect phases of the first portion of the filtered phase hologram beam and generate a phase detection signal, wherein the phase detection signal indicates the phases. The control module is configured to adjust voltages at pixels of the spatial light modulator based on the phases of the phase detection signal.

In other features, the holographic projector or the spatial light modulator includes the control module.

In other features, the control module is implemented as a head up display control module separate from the holographic projector.

In other features, the control module is configured to tune the voltages at the pixels to correct for distortion at the holographic projector and provide a predetermined wavefront out of the holographic projector.

In other features, the spatial light modulator is a liquid crystal on silicon spatial light modulator.

In other features, the first polarization is induced by an orientation of liquid crystal molecules in the spatial light modulator.

In other features, the polarizer is a linear polarizer converting the phase hologram beam having an elliptical polarization to the filtered phase hologram beam having a linear polarization. The elliptical polarization includes the first polarization and the second polarization. The second polarization is the linear polarization.

In other features, a holographic display system is provided and includes a light source, a holographic projector, a beam splitter, a wavefront sensor and a control module. The light source is configured to generate a first light beam. The holographic projector includes a spatial light modulator configured to adjust phases of respective portions of the first light beam to generate a phase hologram beam. The beam splitter is configured to receive and split either the phase hologram beam or a filtered version of the phase hologram beam to provide a first portion of light and a second portion of light. The beam splitter is configured to direct the second portion of light at a diffuser to generate a holographic image. The wavefront sensor is configured to detect phases of the first portion of the light and generate a phase detection signal, wherein the phase detection signal indicates the phases. The control module is configured to adjust voltages at pixels of the spatial light modulator based on the phases of the phase detection signal.

In other features, the holographic display system further includes the diffuser configured to receive the second portion of light and provide the holographic image.

In other features, the holographic display system further includes a polarizer. The phase hologram beam includes a first polarization and a second polarization. The polarizer is configured to filter out light having the first polarization from the phase hologram beam to provide the filtered version of the phase hologram beam having light with the second polarization and not the first polarization.

In other features, the spatial light modulator comprises an array of the pixels. Each of the pixels is configured to adjust phase of a respective portion of the first light beam to generate the phase hologram beam.

In other features, the holographic projector or the spatial light modulator includes the control module.

In other features, the control module is implemented as a head up display control module separate from the holographic projector. The control module is configured to control the light source to generate the first light beam based on received vehicle data.

In other features, a holographic display generation method is provided and includes: generating a first light beam via a light source; adjusting phases of respective portions of the first light beam via a spatial light modulator to generate a phase hologram beam, wherein the phase hologram beam comprises a first polarization and a second polarization; filtering out light having the first polarization from the phase hologram beam via a polarizer to provide a filtered phase hologram beam, wherein the filtered phase hologram beam includes light with the second polarization and does not include light with the first polarization; splitting the filtered phase hologram beam to provide a first portion of the filtered phase hologram beam and a second portion of the filtered phase hologram beam; detecting phases of the first portion of the filtered phase hologram beam and generating a phase detection signal, wherein the phase detection signal indicates the phases; adjusting voltages at pixels of the spatial light modulator based on the phases of the phase detection signal; and providing the second portion of the filtered phase hologram beam to a diffuser to generate a holographic image.

In other features, the method further includes tuning the voltages at the pixels to correct for distortion at the spatial light modulator and provide a predetermined wavefront out of a corresponding holographic projector.

In other features, the method includes converting, via the polarizer, the phase hologram beam having an elliptical polarization to the filtered phase hologram beam having a linear polarization. The polarizer is a linear polarizer. The elliptical polarization includes the first polarization and the second polarization. The second polarization is the linear polarization.

In other features, the spatial light modulator is a liquid crystal on silicon spatial light modulator. The first polarization is induced by an orientation of liquid crystal molecules in the spatial light modulator.

In other features, the spatial light modulator includes an array of the pixels. Each of the pixels is configured to adjust phase of a respective portion of the first light beam to generate the phase hologram beam.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Contrast of images produced in association with phase holography can be reduced due to undesired polarization of light, referred to as "noise", which can be induced by the orientation of liquid crystal molecules in a holographic projection display. Contrast can also be reduced when a SLM does not provide a predetermined output wavefront for a phase hologram due to distortion at a pixel level of the SLM.

The examples set forth herein include HUD systems (or holographic display systems) that include polarizers and/or active phase modulating systems. The polarizers are implemented as optical filters to permit passage of light waves having a certain polarization pass while preventing passage of light waves having other polarizations. The polarizers filter received beams of light having mixed polarization into beams of light having a pre-selected polarization. This improves contrast of generated holographic images at a diffuser of a projection screen. The active phase modulating systems include LCoS SLMs, beam splitters, and wavefront sensors that are used to control phases of portions of a light beam to minimize and/or eliminate distortion. This is accomplished at a pixel level of the LCoS SLMs. Although the polarizers and the active phase modulating systems are complimentary, the polarizers and the active modulating systems may be implemented separately.

Figure 1:
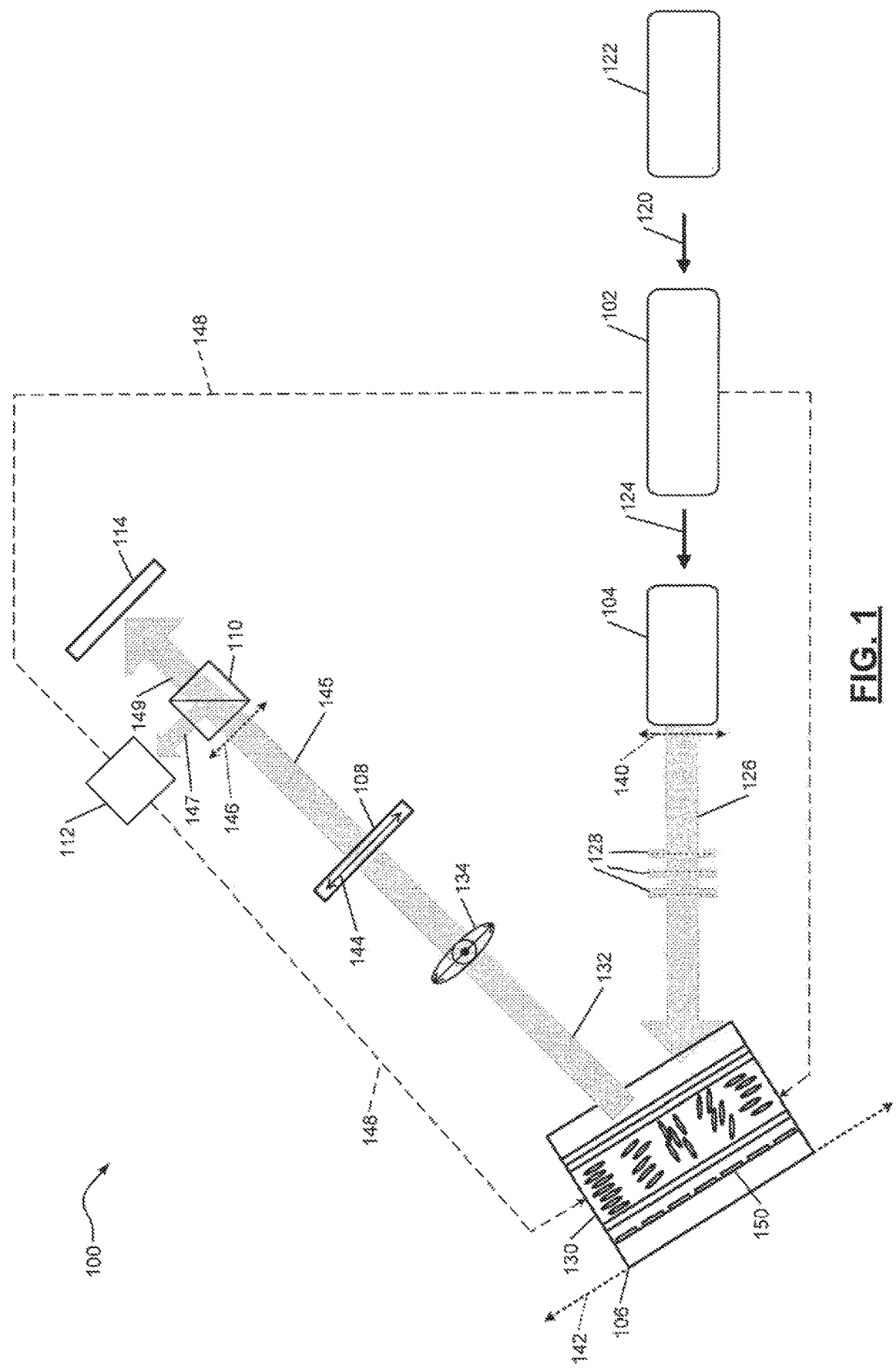
FIG. 1 is a functional block diagram of an example of a head up display (HUD) system including a polarizer and an active phase modulating system in accordance with the present disclosure.

FIG. 1 shows a HUD system 100 that includes a HUD control module 102, a light source 104, a holographic projector 106, a polarizer 108, a beam splitter 110, a wavefront sensor 112, and a diffuser 114. The HUD control module 102 receives vehicle data 120 from a vehicle control module 122. The HUD control module 102 generates signals 124 based on the vehicle data 120. The HUD control module 102 may obtain the vehicle data 120, for example, from a communication bus of the corresponding vehicle. The vehicle data 120 may include, for example, the present speed of the vehicle, the present gear of the transmission of the vehicle, the present engine speed, the present directional heading of the vehicle, infotainment system settings, and/or the other vehicle information.

The light source 104 and the holographic projector 106 encode phase holograms for projection onto, for example, a windshield, based on the signals 124 from the HUD control module 102. The light source 104 may include one or more lasers and output red, green, and blue light (shown as light beam 126). The light beam 126 may include a plane wave, represented by lines 128. The light beam 126 may include other types of waves, such as a spherical wave. The light beam 126, when including plane waves, is a collimated beam that does not diverge at any point. Any point in a lateral plane of the light beam 126 may have a same phase as any other point in the plane for that moment in time. In one embodiment, the light beam 126 is a light array bundle of parallel emitted light rays emitted in a same direction with no angle between the light rays.

The holographic projector 106 may be implemented as a reflective LCoS SLM, as shown, that reflects light received from the light source 104. The holographic projector 106 includes a LCoS SLM (or phase modulator) layer 130 that includes an array of pixels, which phase modulate respective received portions of the light beam 126 to generate a phase hologram beam 132. The holographic projector 106 is further described with respect to FIGS. 3-4.

The phase hologram beam 132 may have an elliptical polarization, represented by ellipse 134. The polarizer 108 may be a linear polarizer and filters the phase hologram beam 132 to filter out light with certain polarization and/or noise caused by a cross-talk effect of the LCoS SLM and misalignment between (i) polarization of incident light from the light source 104 and (ii) an optical axis of the LCoS SLM. This increases the image contrast. Double arrow 140 represents the polarization of the incident light and double arrow 142 represents the optical axis of the LCoS SLM. The polarizer 108 may be oriented, such that a lateral center line 144 of the polarizer 108 is perpendicular to the direction of the phase hologram beam 132. The lateral center line 144 may be parallel to the polarization of the light reflected from the holographic projector 106. Double arrow 146 represented the polarization of the filtered light beam 145 transmitted from the polarizer 108.

The beam splitter 110 receives and splits the phase hologram beam 132, such that a first portion 147 of the light is received at the wavefront sensor 112 and another portion 149 of the light is provided to the diffuser 114. A portion of the light emitted from each of the pixels of the LCoS SLM is received at the wavefront sensor 112. A larger percentage of the light emitted from the holographic projector 106 may be received at the diffuser than at the wavefront sensor 112. A majority of the light intensity out of the holographic projector 106 may be received at the diffuser 114 and the remainder is received at the wavefront sensor 112.

The wavefront sensor 112 may be a complimentary metal-oxide-semiconductor (CMOS) sensor array, a charged-coupled device (CCD) sensor array, a LCD sensor array, or other suitable sensor array for detecting phases of the portions of light emitted respectively from the pixels of the holographic projector 106. The wavefront sensor 112 may include an array of pixels for detecting phases of respective portions of the filtered light beam 145. The wavefront sensor 112 may generate a phase detection signal 148 indicating the detected phases. The phase detection signal 148 may be provided to a circuit layer 150 of the holographic projector 106 and/or to the HUD control module 102. The circuit layer 150 and/or the HUD control module 102 adjusts voltages to the pixels based on the phase detection signal. This may be done to correct an encoded wavefront out of the holographic projector 106 and/or to compensate for distortion and/or diffraction of light out of the holographic projector 106. The wavefront sensor 112 is implemented to sense an actual diffracted wavefront and provide feedback to tune the LCoS SLM. The circuit layer 150 and/or HUD control module 102 adjusts the voltages based on the feedback to provide a predetermined wavefront out of the holographic projector 106, at the beam splitter 110 and/or at the diffuser 114.

In one embodiment, the beam splitter 110 is positioned close to (or within a first predetermined distance of) the diffuser 114. The polarizer 108 is placed close to (or within a second predetermined distance of) the beam splitter 110. This is done such that the phases of the portions of the phase hologram beam as detected by the wavefront sensor 112 closely matches phases of the wavefront received at the diffuser 114 and/or image plane. The further away from the diffuser 114 and/or image plane, the more difficult to accurately modulate and/or adjust the voltages of the pixels of the LCoS SLM to correct wavefront diffraction. In one embodiment, the polarizer 108 is connected to an input face of the beam splitter 110 to provide a beam splitter-polarizer assembly, where the polarizer 108 is aligned to transmit light having a predetermined polarization state. This beam splitter-polarizer assembly may be placed as close as possible to the diffuser 114 and/or point of image production.

Figure 2:
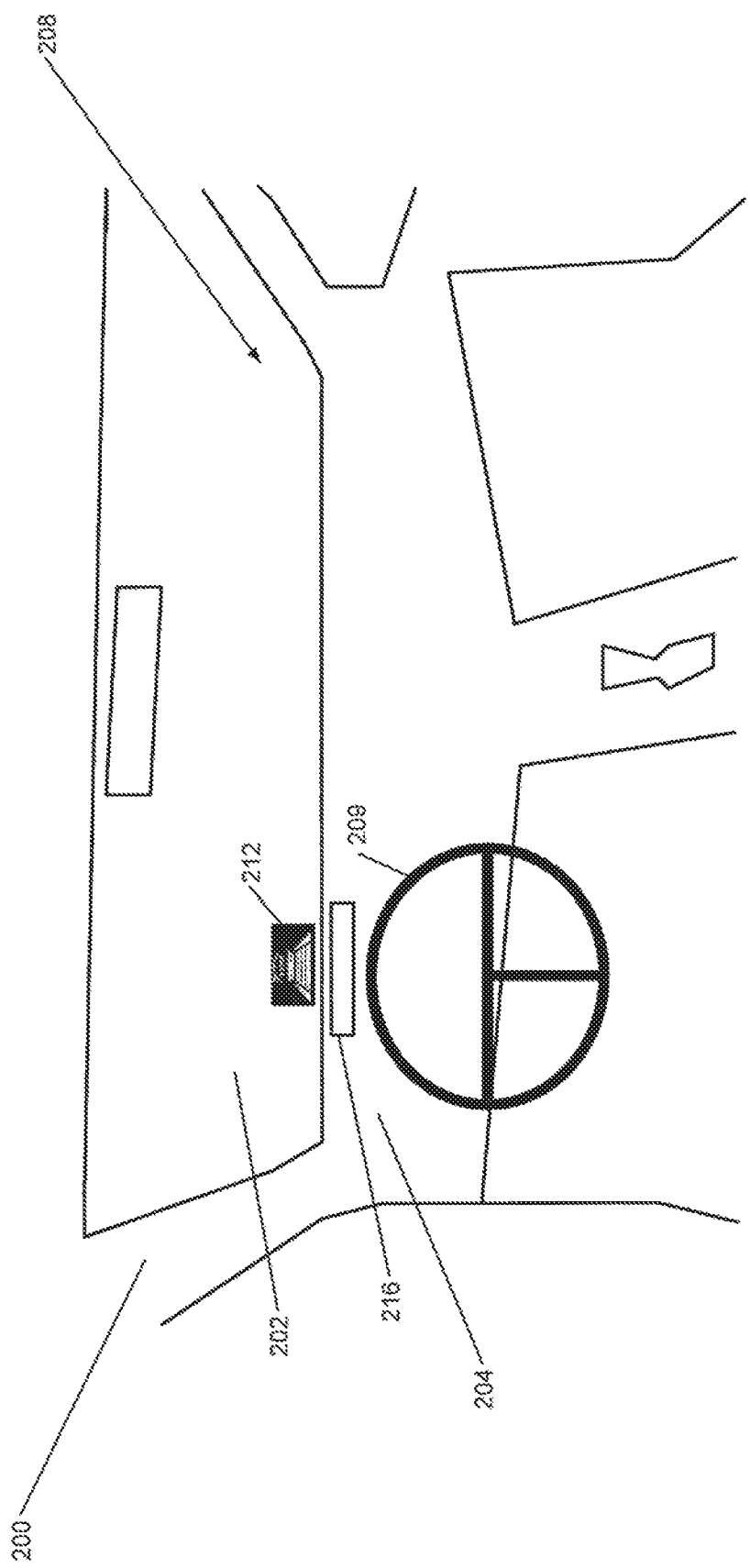
FIG. 2 is an example perspective view from of a driver seat within a passenger cabin of a vehicle.

FIG. 2 includes an example perspective view from a driver seat of an interior of a vehicle 200. The vehicle 200 may be an autonomous vehicle, a semi-autonomous vehicle, or a non-autonomous vehicle. The vehicle 200 includes a windshield 202 located in a front opening of the vehicle 200 above a dashboard 204. Passengers within a passenger cabin 208 of the vehicle 200 can look through the windshield 202 to see in front of the vehicle 200. While the example of a land-based vehicle is described, the present application is also applicable to air-based vehicles (e.g., airplanes, helicopters, etc.) and water-based vehicles (e.g., boats, etc.). Also, while the example of a vehicle is provided, the present application is also applicable to non-vehicle implementations. The vehicle 200 may include a steering wheel 209.

A HUD system, such as one of the HUD systems disclosed herein, projects a hologram 212 onto a portion of the windshield 202 through an aperture 216 in the dashboard 204. The hologram 212 includes various vehicle information, such as a present speed of the vehicle 200, a present gear of a transmission of the vehicle 200, an engine speed, a directional heading of the vehicle 200, present infotainment system settings, and/or other vehicle information. The hologram 212 presents data to the driver of the vehicle without the driver having to look away from objects in front of the vehicle. As discussed further below, the hologram 212 includes replicated instances of one hologram.

Figure 3:
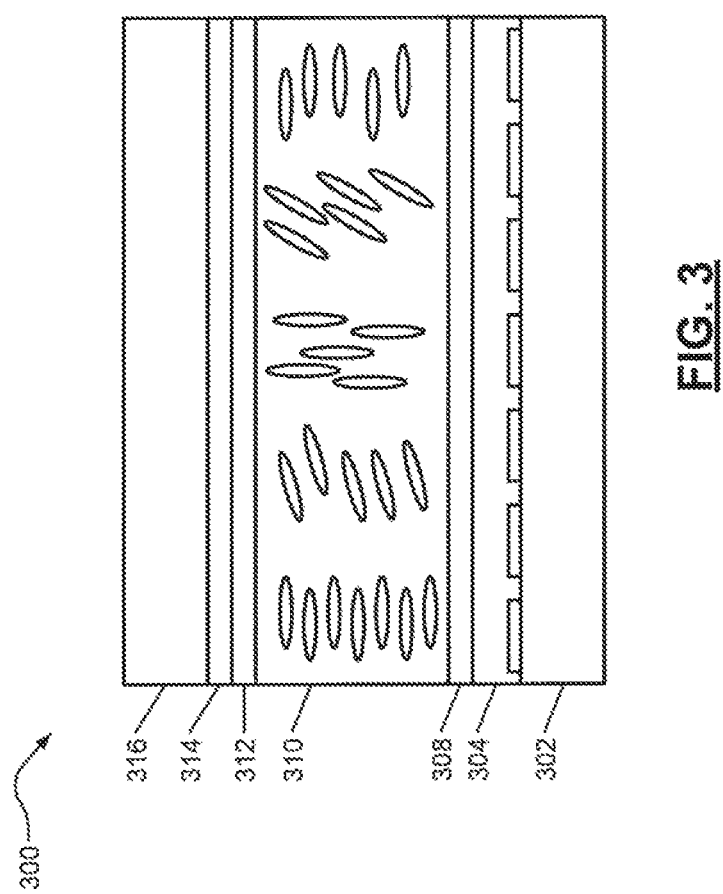
FIG. 3 is a cross-sectional view of an example holographic projector implemented as a reflective liquid crystal on silicon (LCoS) spatial light modulator (SLM)

FIG. 3 shows a holographic projector 300 implemented as a reflective LCoS SLM and may be used in any of the embodiments disclosed herein. The holographic projector 300 may include a silicon backplane layer 302; a LCoS SLM (or phase modulator) layer including a circuit (or pixelized electrode) layer 304, a first alignment layer 308, a liquid crystal layer 310, a second alignment layer 312, a transparent electrode layer 314; and a glass substrate layer 316.

The circuit layer 304 includes control circuitry and/or pixel drivers for controlling the liquid crystal layer 310. The circuit layer 304 may include a transistor for each pixel. Each pixel independently modulates phase of light exiting the LCoS SLM. As an example, if voltages provided to the pixels are different, then phases of light rays out of corresponding portions of the LCoS SLM have different phases. When the light rays constructively and destructively interfere at a diffuser, the result is a viewable image. Each of the pixels may have an associated voltage set. The range of the voltages provided to each pixel may vary the phase of the corresponding portion of the phase hologram beam 132 between, for example, 0-2π to advance or delay the corresponding portion of the light wave coming out of the holographic projector 106.

The circuit layer 304 controls the amount and phase of light emitted from the liquid crystal layer 310. Orientations of molecules in the liquid crystal layer 310 and associated with the pixels of the LCoS SLM change with voltage. The voltage-dependent orientation of molecules induces spatially varying phase distribution on LCoS SLM. The relation between the amount of phase being modulated and applied voltage can be positive related or negative related, depending on the physical property of liquid crystals. The LCoS SLM layer is further described with respect to FIG. 4. The holographic projector 300 may include a reflective film layer when implemented as a reflective holographic projector.

Figure 4:
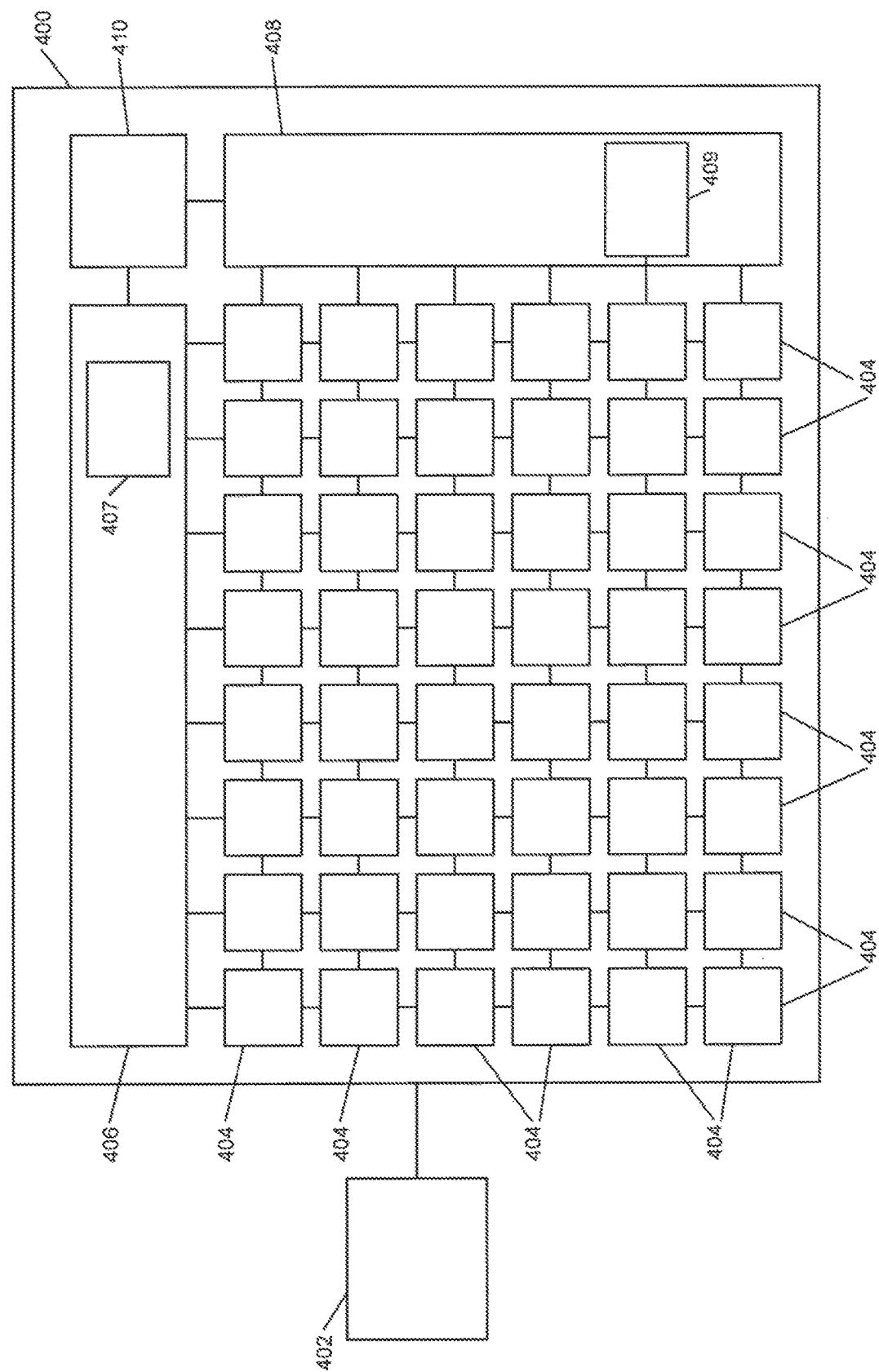
FIG. 4 is a functional block diagram of an example of a portion of a LCoS SLM and a HUD control module in accordance with an embodiment of the present disclosure

FIG. 4 shows a portion 400 of a LCoS SLM layer and a HUD control module 402, which may be implemented in the HUD system 100 of FIG. 1. The LCoS SLM layer may include pixels 404 arranged in an array and connected to drive circuits 406, 408. The LCoS SLM layer may also include a SLM control module 410, which may control the driver circuits 406 and 408, which may receive power from the SLM control module 410 or the HUD control module via switches 407, 409. The SLM control module 410 may receive signals directly from wavefront sensors and/or control signals from the HUD control module 402. The HUD control module 402 may receive phase detection signals and control operation of the SLM control module 410 to adjust voltages provided to the pixels 404. In another embodiment, the SLM control module 410 directly receives the phase detection signals and controls the drive circuits 406, 408 to generate the appropriate voltages, which are applied at the pixels 404.

Figure 5:
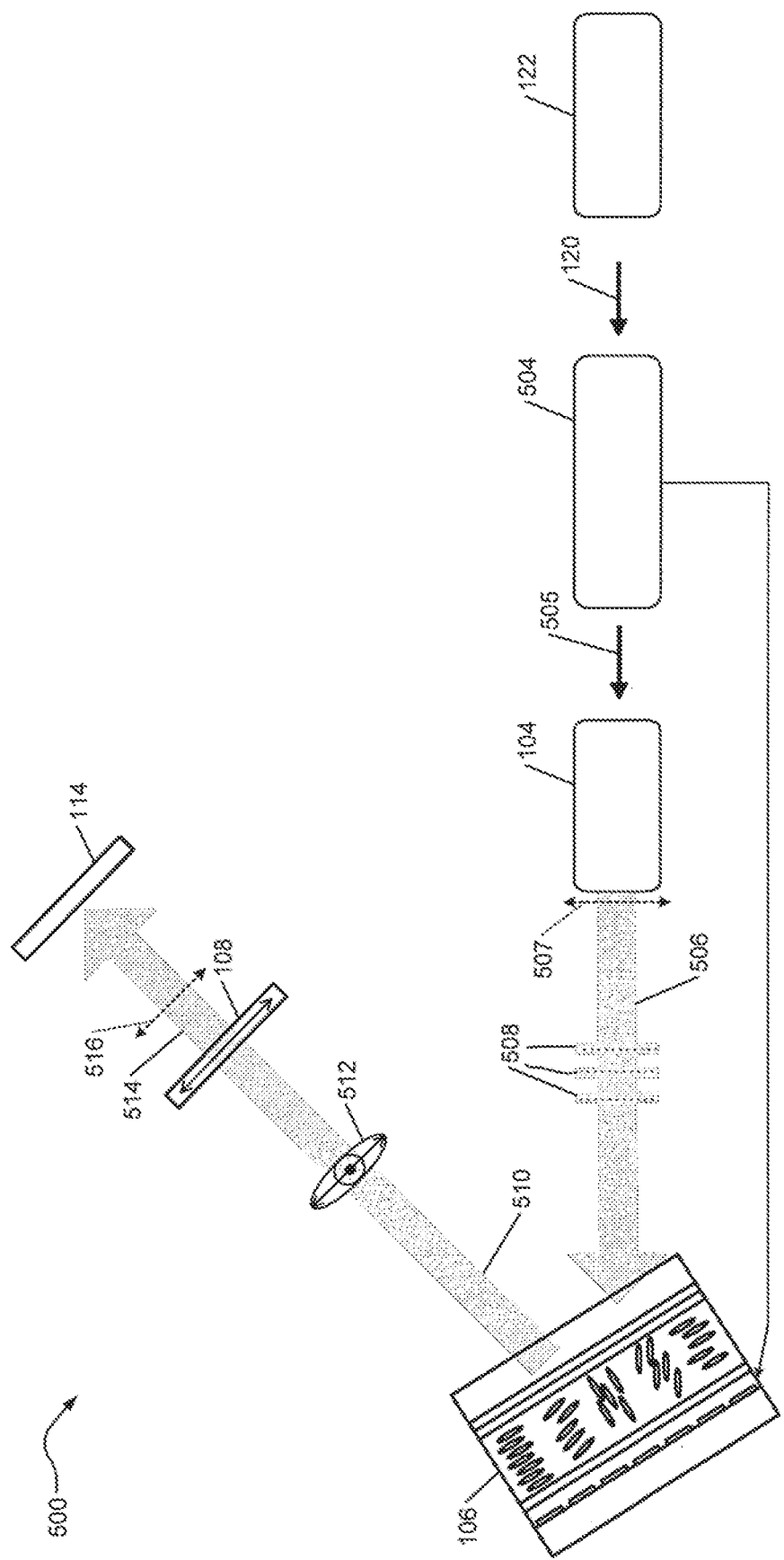
FIG. 5 is a functional block diagram of an example of another HUD system including a polarizer without active phase modulating in accordance with the present disclosure.

FIG. 5 shows a HUD system 500 including the polarizer 108. In an embodiment, the HUD system 100 of FIG. 1 is implemented without active phase modulating, as shown in FIG. 5. The HUD system 500 includes a HUD control module 504, the light source 104, a holographic projector 106 and the diffuser 114. The HUD control module 504 receives the vehicle data 120 from the vehicle control module 122 and generates signals 505 for controlling operation of the light source 104. The light source 104 generates a light beam 506 having a polarization represented by double arrow 507. The light beam 506 may have a plane waves represented by lines 508. The holographic projector 106 generates a phase hologram beam 510, which has an elliptical polarization represented by ellipse 512.

The phase hologram beam 510 is transmitted at the polarizer 108, which filters the phase hologram beam 510 to provide an output beam 514 having a certain polarization, represented by double arrow 516 and provided at the diffuser 114.

Figure 6:
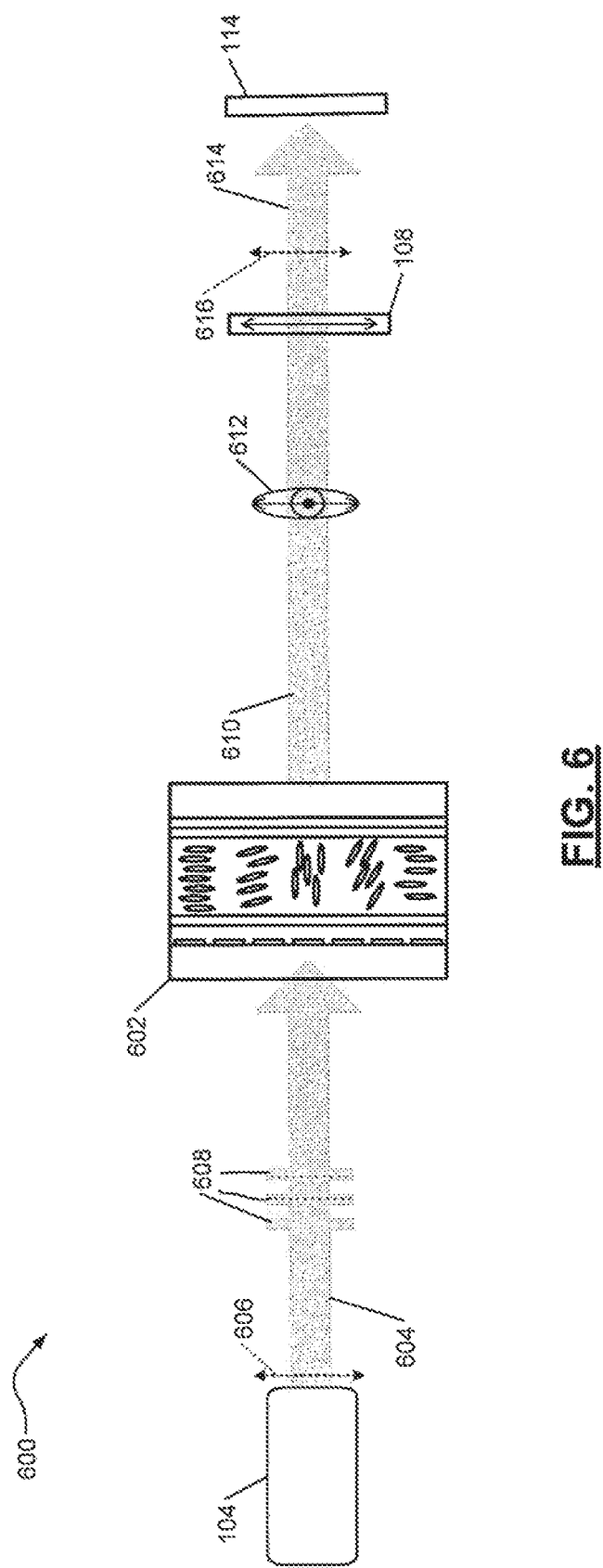
FIG. 6 is a functional block diagram of an example of another HUD system including a transmissive LCoS SLM and a polarizer in accordance with the present disclosure.

FIG. 6 shows a HUD system 600 including a transmissive LCoS SLM 602 and the polarizer 108. The light source 104 generates a light beam 604 having a polarization represented by double arrow 606. The light beam 506 may have a plane waves represented by lines 608. The transmissive LCoS SLM (or holographic projector) 602 generates a phase hologram beam 610, which has an elliptical polarization represented by ellipse 612. Although not shown, a HUD control module, such as one of the HUD control modules disclosed herein, may be used to control the voltages supplied to the pixels of the transmissive LCoS SLM 602.

The phase hologram beam 610 is transmitted at the polarizer 108, which filters the phase hologram beam 610 to provide an output beam 614 having a certain polarization, represented by double arrow 616 and provided at the diffuser 114.

Figure 7:
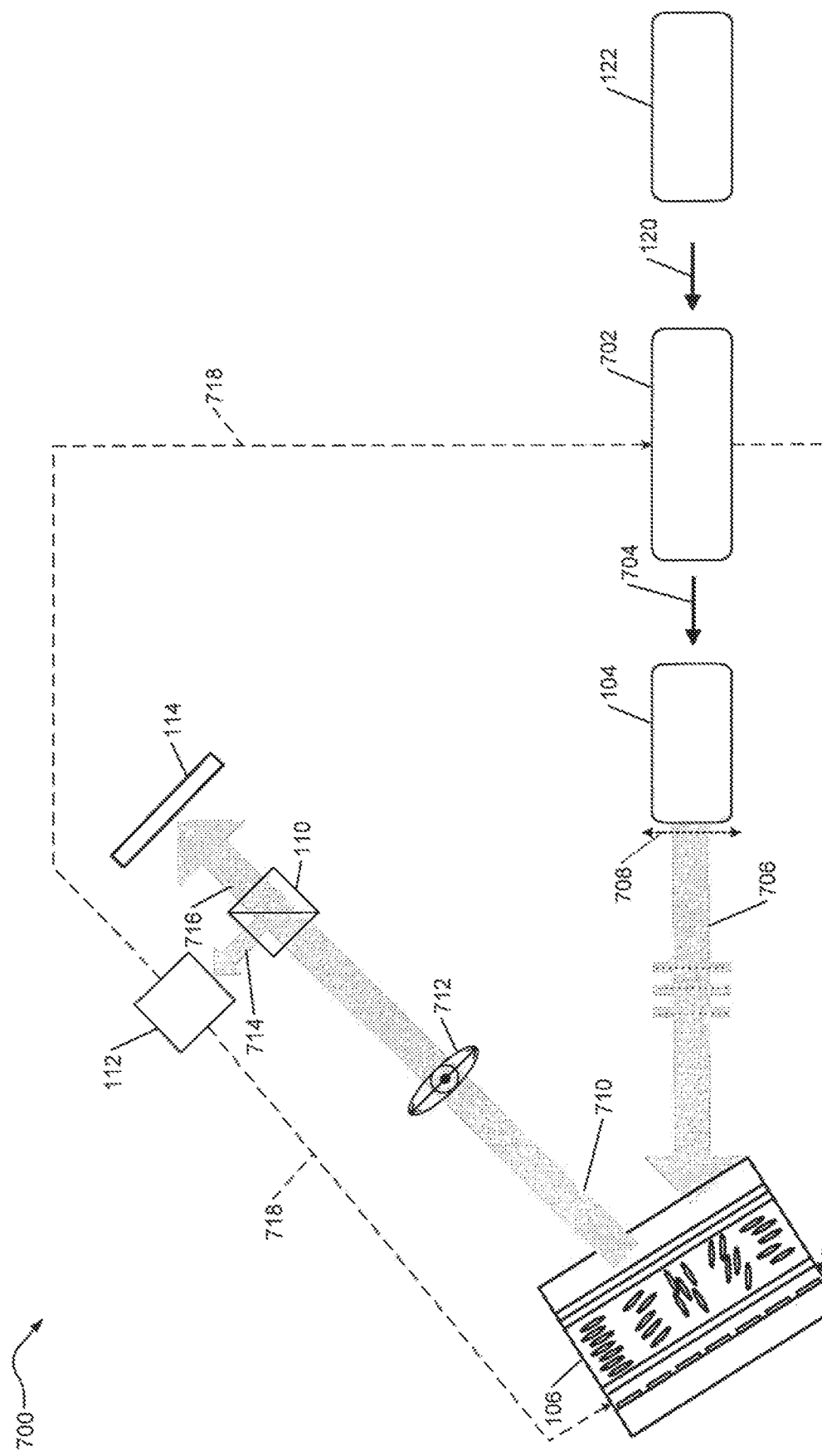
FIG. 7 is a functional block diagram of an example of another HUD system including active phase modulating without use of a polarizer in accordance with the present disclosure.

FIG. 7 shows a HUD system 700 including active phase modulating without use of a polarizer. The HUD system 700 includes a HUD control module 702, the light source 104, the holographic projector 106, the beam splitter 110, the wavefront sensor 112, and the diffuser 114. The HUD control module 702 receives vehicle data 120 from a vehicle control module 122. The HUD control module 702 generates signals 704 based on the vehicle data 120. The light source 104 generates a light beam 706 based on the signals 704 having a polarization, represented by double arrow 708.

The holographic projector 106 may be implemented as a reflective LCoS SLM, as shown, that reflects light received from the light source 104. The holographic projector 106 phase modulates respective received portions of the light beam 706 to generate a phase hologram beam 710.

The phase hologram beam 710 may have an elliptical polarization, represented by ellipse 712. The beam splitter 110 receives and splits the phase hologram beam 710, such that a first portion 714 of the light is received at the wavefront sensor 112 and another portion 716 of the light is provided to the diffuser 114. The wavefront sensor 112 generates a phase detection signal 718 indicative of the detected phases. The phase detection signal 148 may be provided to the circuit layer 150 of the holographic projector 106 and/or to the HUD control module 702. The circuit layer 150 and/or the HUD control module 702 adjusts voltages to the pixels based on the phase detection signal. The wavefront sensor 112 is implemented to sense an actual diffracted wavefront and provide feedback to tune the LCoS SLM. The circuit layer 150 and/or HUD control module 702 adjusts the voltages based on the feedback to provide a predetermined wavefront out of the holographic projector 106, at the beam splitter 110 and/or at the diffuser 114.

Figure 8:
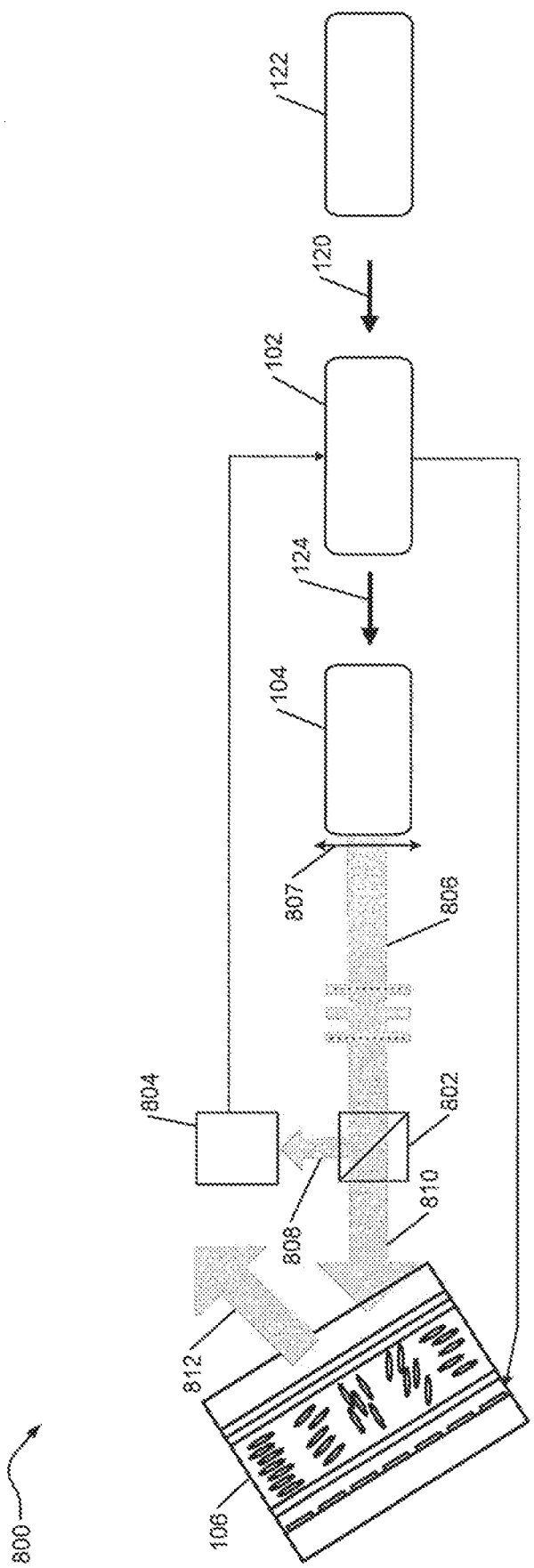
FIG. 8 is a functional block diagram of an example of a portion of another HUD system illustrating use of incident light detection and associated compensation in accordance with the present disclosure.

FIG. 8 shows a portion 800 of another HUD system, similar to the HUD system of FIG. 1. The HUD system uses incident light detection and associated compensation. The HUD system 800 includes the HUD control module 102, the light source 104, the holographic projector 106, a beam splitter 802 and a wavefront sensor 804. The HUD control module 102 receives the vehicle data 120 from the vehicle control module 122. The HUD control module 102 outputs signals 124 to control operation of the light source 104, which generates a light beam 806 having polarization 807. The beam splitter 802 directs a portion 808 of the light beam 806 to the wavefront sensor 804 and another portion 810 of the light beam 806 to the holographic projector 106 in a similar manner as the beam splitter 110 of FIG. 1.

The wavefront sensor 804 may be implemented between the light source 104 and the LCoS SLM. The wavefront sensor 804 may be used to sense if a wavefront from the light source 104 is distorted and send a feedback signal to the HUD control module 102. The HUD control module 102 may then signal the LCoS SLM to compensate for the distorted wavefront being provided to the holographic projector 106 to correct a light beam 812 output from the holographic projector 106.

Figure 9:
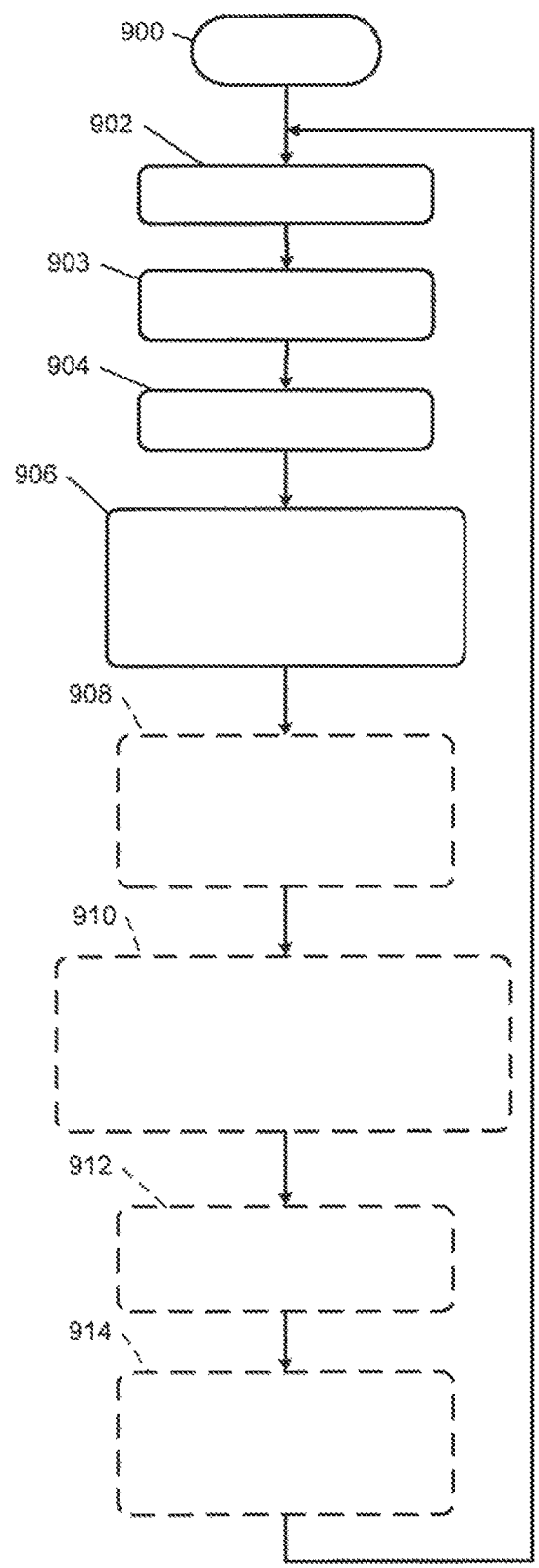
FIG. 9 illustrates a holographic image generation method in accordance with the present disclosure.

FIG. 9 shows a holographic image generation method. Although the following operations are primarily described with respect to the implementations of FIGS. 1 and 4-7, the operations may be easily modified to apply to other implementations of the present disclosure. The operations may be iteratively performed.

The method may begin at 900. At 902, the vehicle control module generates the vehicle data 120. At 903, the HUD control module 102 generates one or more control signals (e.g., one of the signals 124) based on the vehicle data 120. At 904, the light source 104 generates a light beam (e.g., the light beam 126) based on the one or more control signals.

At 906, the LCoS SLM layer of the holographic projector 106 and/or the HUD control module 102 controls states of the pixels of the holographic projector 106 to generate a phase hologram beam (e.g., the phase hologram beam 132) having corresponding portions of light with phases set by the LCoS SLM layer and/or HUD control module 102. The phases are set and/or adjusted by the LCoS SLM layer and/or HUD control module 102. The HUD control module 102 may encode phase distribution pixel-by-pixel and provide voltages to the pixels to form a corresponding image at diffuser 114 after passing light through LCoS SLM layer.

At 908, the phase hologram beam may be passed through the polarizer 108 to generate a filtered phase hologram beam, as described above. At 910, the beam splitter 110, if implemented, splits the filtered phase hologram beam received from the polarizer 108 or a non-filtered phase hologram beam (i.e. the phase hologram beam out of the holographic projector 106), depending on whether the polarizer 108 is included. The beam splitter 110 splits the filtered or non-filtered phase hologram beam into a first portion and a second portion. The second portion 110 is provided to the diffuser 114. The filtered phase hologram beam may be provided to the diffuser 114 when the beam splitter 110 is not utilized.

At 912, the wavefront sensor 112, if implemented, receives the first portion of the filtered or non-filtered phase hologram beam and detects the phases of the respective portions of the first portion. The wavefront sensor 112 generates a phase detection signal indicating the phases. The phase detection signal may be provided to the LCoS SLM layer or to the HUD control module 102.

At 914, the LCoS SLM layer or to the HUD control module 102 adjusts voltages provided to the pixels of the LCoS SLM layer based on the phases of the phase detection signal. These adjustments may be based on predetermined and/or references phases. The LCoS SLM layer or to the HUD control module 102 may compare the detected phases to predetermined and/or references phases to generate error values and adjust the voltages based on the error values.

Operation 902 may be performed subsequent to performing operation 914 as shown or after, for example, operation 906 or 908 depending on whether the polarizer 108, beam splitter 110 and/or the wavefront sensor 112 are utilized.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples improve image quality via phase holography by removing certain polarizations states of light and applying pixel level voltages to correct wavefront aberrations. Polarizers are used to filter out undesired polarization states of light coming out of holographic projectors (or holographic picture generating devices), thereby eliminating secondary image generation. Secondary image generation negatively affects a primary image by effectively adding noise or other non-selected (or unwanted) polarization of light to pre-selected (or wanted) polarization of light, which reduces image quality. Additionally wavefront sensors are used to characterize diffracted wavefronts from the holographic projectors. If a detected wavefront is diffracted and has a deviation from a predetermined wavefront, pixelated phase levels of the LCoS SLMs are fine-tuned by adjusting the voltages of the pixels. The examples may be applied to transmissive and reflective type holographic projection displays.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A holographic display system comprising:
a light source configured to generate a first light beam;
a holographic projector including a spatial light modulator configured to adjust phases of respective portions of the first light beam to generate a phase hologram beam, wherein the phase hologram beam comprises a first polarization and a second polarization;
a polarizer configured to filter out light having the first polarization from the phase hologram beam to provide at least a portion of a filtered phase hologram beam at a diffuser to generate a holographic image, wherein the filtered phase hologram beam includes light with the second polarization and does not include light with the first polarization;
a beam splitter configured to receive and split the filtered phase hologram beam to provide a first portion of the filtered phase hologram beam and a second portion of the filtered phase hologram beam, wherein the second portion is provided to the diffuser;
a wavefront sensor configured to detect phases of the first portion of the filtered phase hologram beam and generate a phase detection signal, wherein the phase detection signal indicates the phases; and
a control module configured to adjust voltages at pixels of the spatial light modulator based on the phases of the phase detection signal.

2. The holographic display system of claim 1, further comprising the diffuser configured to receive the at least a portion of the filtered phase hologram beam and provide the holographic image.

3. The holographic display system of claim 1, wherein the holographic projector or the spatial light modulator includes the control module.

4. The holographic display system of claim 1, wherein the control module is implemented as a head up display control module separate from the holographic projector.

5. The holographic display system of claim 1, wherein the control module is configured to tune the voltages at the pixels to correct for distortion at the holographic projector and provide a predetermined wavefront out of the holographic projector.

6. The holographic display system of claim 1, wherein the spatial light modulator is a liquid crystal on silicon spatial light modulator.

7. The holographic display system of claim 1, wherein the first polarization is induced by an orientation of liquid crystal molecules in the spatial light modulator.

8. The holographic display system of claim 1, wherein:
the polarizer is a linear polarizer converting the phase hologram beam having an elliptical polarization to the filtered phase hologram beam having a linear polarization;
the elliptical polarization includes the first polarization and the second polarization; and
the second polarization is the linear polarization.

9. A holographic display system,
a light source configured to generate a first light beam;
a holographic projector including a spatial light modulator configured to adjust phases of respective portions of the first light beam to generate a phase hologram beam;
a beam splitter configured to receive and split either the phase hologram beam or a filtered version of the phase hologram beam to provide a first portion of light and a second portion of light, the filtered version is received from a polarizer filtering the phase hologram beam, and the beam splitter is configured to direct the second portion of light at a diffuser to generate a holographic image;
a wavefront sensor configured to detect phases of the first portion of the light and generate a phase detection signal, wherein the phase detection signal indicates the phases; and a control module configured to adjust voltages at pixels of the spatial light modulator based on the phases of the phase detection signal.

10. The holographic display system of claim 9, further comprising the diffuser configured to receive the second portion of light and provide the holographic image.

11. The holographic display system of claim 9, wherein:
the phase hologram beam comprises a first polarization and a second polarization; and
the polarizer is configured to filter out light having the first polarization from the phase hologram beam to provide the filtered version of the phase hologram beam having light with the second polarization and not the first polarization.

12. The holographic display system of claim 9, wherein:
the spatial light modulator comprises an array of the pixels, and
each of the pixels is configured to adjust phase of a respective portion of the first light beam to generate the phase hologram beam.

13. The holographic display system of claim 9, wherein the holographic projector or the spatial light modulator includes the control module.

14. The holographic display system of claim 9, wherein:
the control module is implemented as a head up display control module separate from the holographic projector; and
the control module is configured to control the light source to generate the first light beam based on received vehicle data.

15. A holographic display generation method comprising:
generating a first light beam via a light source;
adjusting phases of respective portions of the first light beam via a spatial light modulator to generate a phase hologram beam, wherein the phase hologram beam comprises a first polarization and a second polarization;
filtering out light having the first polarization from the phase hologram beam via a polarizer to provide a filtered phase hologram beam, wherein the filtered phase hologram beam includes light with the second polarization and does not include light with the first polarization;
splitting, via a beam splitter, the filtered phase hologram beam to provide a first portion of the filtered phase hologram beam and a second portion of the filtered phase hologram beam;
detecting, via a wavefront sensor, phases of the first portion of the filtered phase hologram beam and generating a phase detection signal, wherein the phase detection signal indicates the phases;
adjusting, via a control module, voltages at pixels of the spatial light modulator based on the phases of the phase detection signal; and
providing the second portion of the filtered phase hologram beam to a diffuser to generate a holographic image.

16. The holographic display generation method of claim 15, further comprising tuning the voltages at the pixels to correct for distortion at the spatial light modulator and provide a predetermined wavefront out of a corresponding holographic projector.

17. The holographic display generation method of claim 15, comprising converting, via the polarizer, the phase hologram beam having an elliptical polarization to the filtered phase hologram beam having a linear polarization, wherein:
the polarizer is a linear polarizer;
the elliptical polarization includes the first polarization and the second polarization; and
the second polarization is the linear polarization.

18. The holographic display generation method of claim 15, wherein:
the spatial light modulator is a liquid crystal on silicon spatial light modulator; and
the first polarization is induced by an orientation of liquid crystal molecules in the spatial light modulator.

19. The holographic display generation method of claim 15, wherein:
the spatial light modulator comprises an array of the pixels, and
each of the pixels is configured to adjust phase of a respective portion of the first light beam to generate the phase hologram beam.

* * * * *